United States Patent
Harris et al.

(10) Patent No.: US 10,309,417 B2
(45) Date of Patent: *Jun. 4, 2019

(54) TURBOCHARGER HAVING IMPROVED PORTED SHROUD COMPRESSOR HOUSING

(71) Applicant: BorgWarner Inc., Auburn Hills, MI (US)

(72) Inventors: Thomas Craig Harris, Boiling Springs, SC (US); Daniel Pruitt, Boiling Springs, SC (US); David Ledger, Asheville, NC (US); Paul Edmonds, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/594,236

(22) Filed: May 12, 2017

(65) Prior Publication Data

US 2018/0328378 A1 Nov. 15, 2018

(51) Int. Cl.
*F02B 33/44* (2006.01)
*F04D 29/42* (2006.01)
(Continued)

(52) U.S. Cl.
CPC .......... *F04D 29/4206* (2013.01); *F02B 33/40* (2013.01); *F02B 39/02* (2013.01);
(Continued)

(58) Field of Classification Search
CPC .. F04D 29/4206; F04D 29/284; F04D 29/662; F04D 29/40; F04D 29/403
(Continued)

(56) References Cited

U.S. PATENT DOCUMENTS

| 4,930,979 A | 6/1990 | Fisher et al. |
|---|---|---|
| 5,295,785 A | 3/1994 | Church et al. |

(Continued)

FOREIGN PATENT DOCUMENTS

| CN | 102297149 A | 12/2011 |
|---|---|---|
| DE | 10 2013 210 994 A1 | 12/2013 |

(Continued)

OTHER PUBLICATIONS

Human translation of JP 2009068372 A.*
(Continued)

*Primary Examiner* — Ngoc T Nguyen
(74) *Attorney, Agent, or Firm* — Howard & Howard Attorneys PLLC

(57) ABSTRACT

A turbocharger includes ported shroud compressor housing disposed about a compressor wheel, having an air inlet passage extending axially along and circumferentially about a longitudinal axis, volute base portion operably adjacent to compressor wheel, contour that encircles and complementarily matches compressor wheel, inducer including ring and plurality of extending members, inlet section extending from volute base portion, and recirculation cavity formed in volute base portion and inlet section with a recirculation slot and inlet slot for reentry of airflow into inlet section. The ring has an inner wall surface defining a first section extending axially along the longitudinal axis and proximate to the compressor wheel, second section extending from first section radially away from longitudinal axis, and third section extending from second section along longitudinal axis and distal to the compressor wheel. The inlet section has a first diameter and third section has a second diameter greater than first diameter.

30 Claims, 4 Drawing Sheets

(51) Int. Cl.

| | | |
|---|---|---|
| *F02B 39/02* | (2006.01) | |
| *F04D 29/28* | (2006.01) | |
| *F04D 29/053* | (2006.01) | |
| *F04D 29/66* | (2006.01) | |
| *F04D 25/04* | (2006.01) | |
| *F04D 27/02* | (2006.01) | |
| *F02M 35/10* | (2006.01) | |
| *F02B 33/40* | (2006.01) | |
| *F02B 39/10* | (2006.01) | |
| *F02B 37/16* | (2006.01) | |

(52) U.S. Cl.
CPC ....... *F02B 39/10* (2013.01); *F02M 35/10157* (2013.01); *F02M 35/10262* (2013.01); *F04D 25/04* (2013.01); *F04D 27/0207* (2013.01); *F04D 29/053* (2013.01); *F04D 29/284* (2013.01); *F04D 29/4213* (2013.01); *F04D 29/662* (2013.01); *F04D 29/667* (2013.01); *F02B 37/16* (2013.01); *F05D 2220/40* (2013.01); *F05D 2260/96* (2013.01)

(58) Field of Classification Search
USPC .................. 415/58.4, 58.6, 119; 123/559.1; 60/605.1
See application file for complete search history.

(56) References Cited

U.S. PATENT DOCUMENTS

| | | | |
|---|---|---|---|
| 5,399,064 A | 3/1995 | Church et al. | |
| 6,623,239 B2 | 9/2003 | Sahay et al. | |
| 6,932,563 B2 | 8/2005 | Cabrales et al. | |
| 7,083,379 B2 | 8/2006 | Nikpour et al. | |
| 7,229,243 B2 | 6/2007 | Nikpour et al. | |
| 7,549,506 B2 | 6/2009 | Sattinger | |
| 7,624,575 B2 | 12/2009 | Noelle et al. | |
| 7,775,759 B2 | 8/2010 | Sirakov et al. | |
| 7,942,625 B2 | 5/2011 | Sirakov et al. | |
| 8,061,974 B2 | 11/2011 | Gu et al. | |
| 8,146,358 B2 | 4/2012 | Greentree | |
| 8,272,834 B2 | 9/2012 | Lefevre | |
| 8,926,264 B2 | 1/2015 | Ring et al. | |
| 9,086,002 B2 | 7/2015 | Konig | |
| 9,303,561 B2 | 4/2016 | Karim et al. | |
| 9,482,240 B2 | 11/2016 | Gerard et al. | |
| 9,777,640 B2* | 10/2017 | Mohtar | F02B 37/225 |
| 2002/0015640 A1 | 2/2002 | Nishiyama et al. | |
| 2008/0056882 A1 | 3/2008 | Clay et al. | |
| 2008/0292449 A1 | 11/2008 | Lefevre | |
| 2010/0098532 A1 | 4/2010 | Diemer et al. | |
| 2011/0097194 A1 | 4/2011 | Schick et al. | |
| 2011/0173975 A1* | 7/2011 | Sun | F02B 47/08 60/605.2 |
| 2011/0255952 A1 | 10/2011 | Williams et al. | |
| 2013/0058762 A1 | 3/2013 | Ring et al. | |
| 2013/0343886 A1 | 12/2013 | Karim et al. | |
| 2014/0020975 A1 | 1/2014 | Konig | |
| 2014/0056696 A1 | 2/2014 | Kawano et al. | |
| 2014/0322003 A1 | 10/2014 | Isogai et al. | |
| 2015/0044023 A1 | 2/2015 | Schlarb et al. | |
| 2015/0159664 A1 | 6/2015 | Olin et al. | |
| 2015/0167695 A1* | 6/2015 | Saito | F04D 29/266 417/407 |
| 2015/0192147 A1 | 7/2015 | An et al. | |
| 2015/0219121 A1 | 8/2015 | King | |
| 2016/0017791 A1 | 1/2016 | Nakao | |
| 2016/0090901 A1* | 3/2016 | Svihla | F02B 37/02 60/605.1 |
| 2016/0305453 A1* | 10/2016 | Burgess | F02B 37/12 |

FOREIGN PATENT DOCUMENTS

| | | | |
|---|---|---|---|
| EP | 0526965 A2 | 2/1993 | |
| EP | 2 024 643 B1 | 3/2017 | |
| JP | H0560097 A | 3/1993 | |
| JP | 2009068372 A | 4/2009 | |
| JP | 5125718 B2 | 1/2013 | |
| WO | WO 2013191937 A1 * | 12/2013 | F02C 7/045 |

OTHER PUBLICATIONS

English language abstract and machine-assisted English translation for CN 102297149 extracted from espacenet.com database on May 4, 2017, 17 pages.
Machine-assisted English language abstract for DE 10 2013 321 994 extracted from espacenet.com database on May 4, 2017, 2 pages.
English language abstract and machine-assisted English translation for JP 5125718 extracted from espacenet.com database on May 4, 2017, 11 pages.
U.S. Appl. No. 15/594,289, filed May 12, 2017.
English language abstract and machine-assisted English translation for JPH 05-60097 extracted from espacenet.com database on Aug. 8, 2018, 8 pages.
English language abstract and machine-assisted English translation for JP 2009-068372 extracted from espacenet.com database on Aug. 8, 2018, 14 pages.
International Search Report for Application No. PCT/US2018/031721 dated Jul. 17, 2018, 3 pages.
International Search Report for Application No. PCT/US2018/031719 dated Jul. 18, 2018, 4 pages.

* cited by examiner

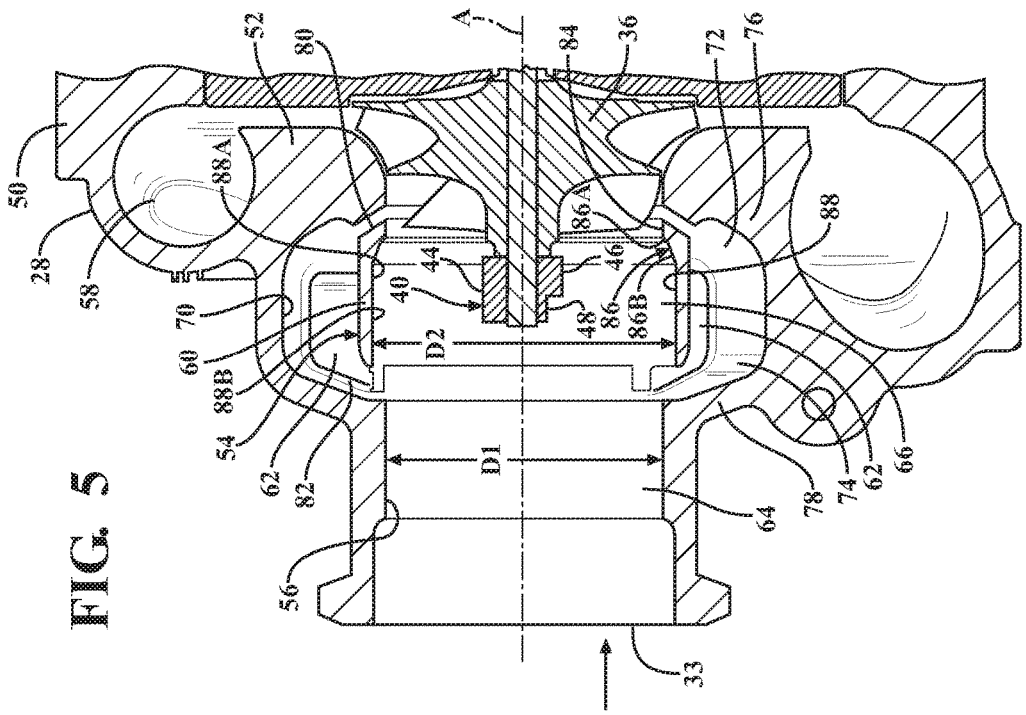
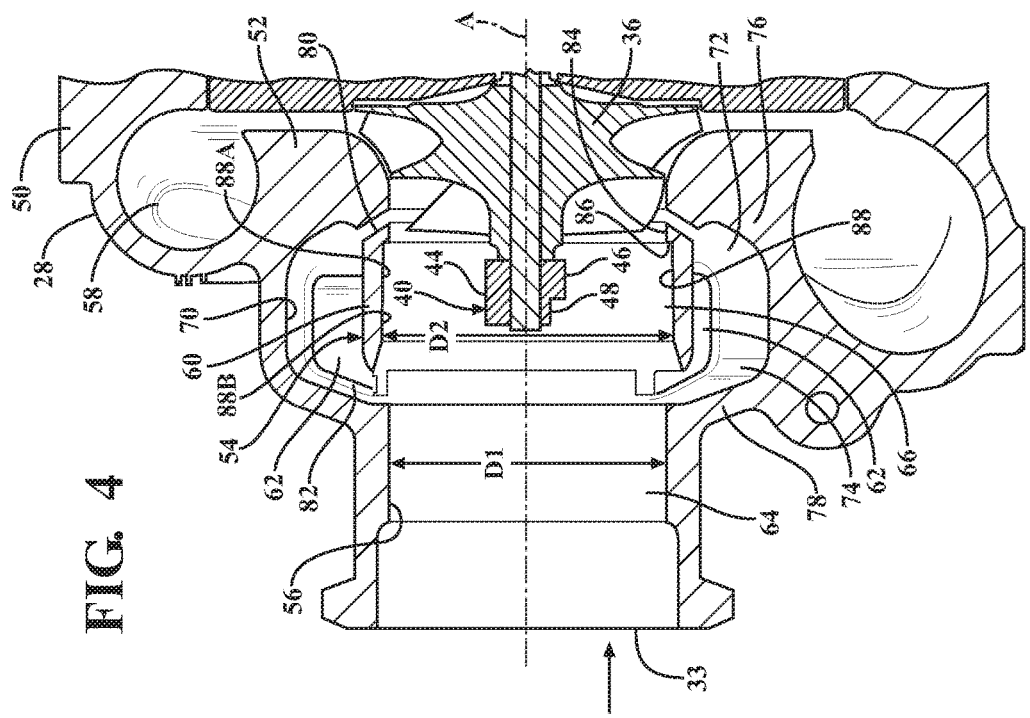

FIG. 6
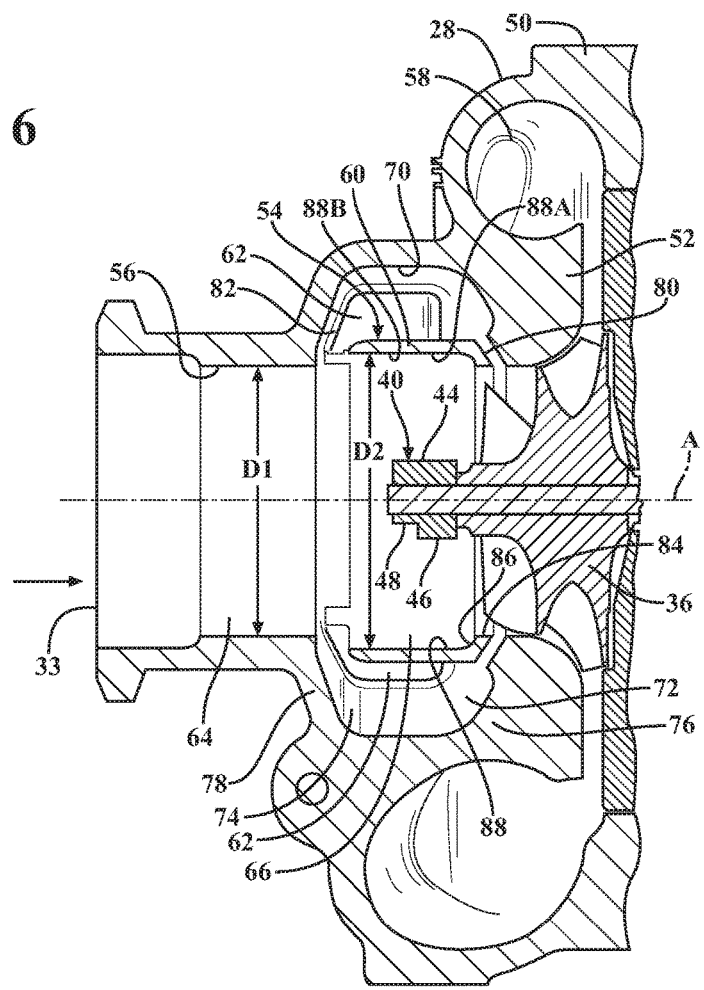
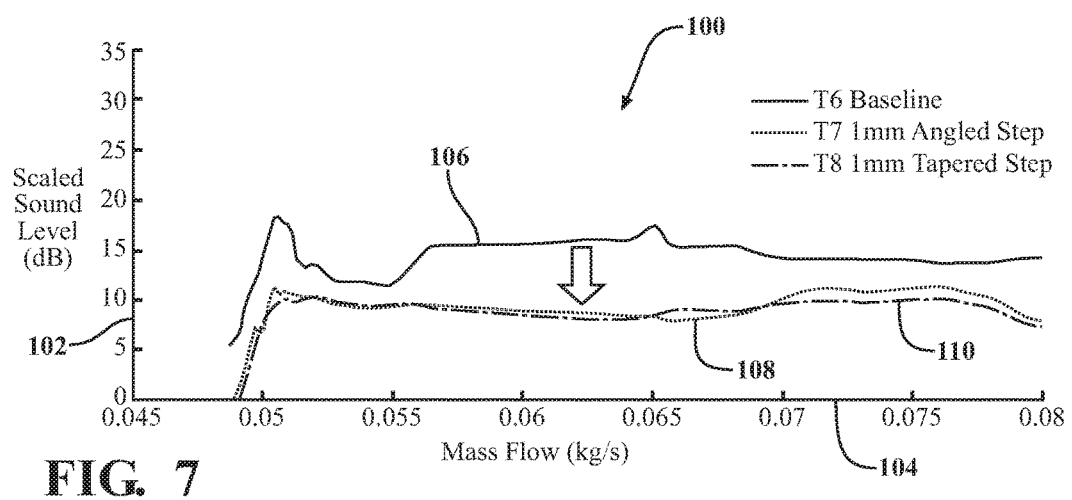
FIG. 7

TURBOCHARGER HAVING IMPROVED PORTED SHROUD COMPRESSOR HOUSING

BACKGROUND OF INVENTION

1. Field of Invention

The present invention relates generally to turbochargers and, more specifically, to a turbocharger having an improved ported shroud compressor housing to improve NVH.

2. Description of the Related Art

It is known to provide a turbocharger for an engine of a vehicle such as an automotive vehicle. An automotive turbocharger typically includes a compressor wheel and a turbine wheel on a common turbocharger shaft supported by bearings in a center or shaft housing. The turbine wheel of the turbocharger extracts some of the energy in exhaust gas from the engine, and transfers this power to the compressor wheel. The compressor wheel increases an intake air density into the engine, and thereby the engine power.

The turbocharger may include a compressor housing or cover. One type of compressor housing is a ported shroud compressor housing that is typically used for speed line stability and map width enhancement. The ported shroud compressor housing also improves broad band flow noise between one and eleven kilohertz.

Some turbochargers have the compressor wheel threaded onto the shaft. Other turbochargers have the compressor wheel disposed about the shaft and a compressor nut to secure the compressor wheel to the shaft. A standard compressor nut features an outboard cylindrical region with a balance cut or imbalance correction region for the purpose of imbalance correction of the shaft. However, interaction between this standard compressor nut with the imbalance correction region and the ported shroud compressor housing can create aero-acoustic noises such as a first order pulsation noise.

Therefore, it is desirable to provide a turbocharger with a new ported shroud compressor housing to reduce aero-acoustic noises. It is also desirable to provide a turbocharger with a ported shroud compressor housing having an inlet geometry to reduce a sensitivity of first order pulsation noise and blade pass (BPF) error states. It is further desirable to provide a turbocharger with a ported shroud compressor housing that improves broad band flow and that reduces first order pulsation noise due to interaction between a standard compressor nut with an imbalance correction region and the ported shroud compressor housing. Thus, there is a need in the art to provide a turbocharger with a ported shroud compressor housing that meets at least one of these desires.

SUMMARY OF THE INVENTION

The present invention provides a turbocharger including a rotatable turbocharger shaft extending along a longitudinal axis, and a compressor wheel coupled to and rotatable by the turbocharger shaft for compressing air to be delivered to an internal combustion engine. The turbocharger also includes a ported shroud compressor housing disposed about the compressor wheel and having an air inlet passage extending axially along and circumferentially about the longitudinal axis. The ported shroud compressor housing includes a volute base portion operably adjacent to the compressor wheel, a contour that encircles and complementarily matches the compressor wheel, an inducer including a ring and a plurality of extending members, an inlet section extending from the volute base portion, and a recirculation cavity formed in the volute base portion and the inlet section with a recirculation slot and an inlet slot for reentry of airflow into the inlet section. The ring has an innermost surface defining a first section extending axially along the longitudinal axis and proximate to the compressor wheel, a second section extending from the first section radially away from the longitudinal axis, and a third section extending from the second section along the longitudinal axis and distal to the compressor wheel. The inlet section has a first diameter and the third section has a second diameter greater than the first diameter.

One advantage of the present invention is that a turbocharger is provided having a ported shroud compressor housing and a compressor nut having an imbalance correction region to improve NVH and rotor stability performance. Another advantage of the present invention is that the ported shroud compressor housing has an inlet geometry to reduce the sensitivity of first order pulsation noise and blade pass (BPF) error states that generate a pulsation noise or other aero-acoustic issues. Yet another advantage of the present invention is that the ported shroud compressor housing improves broad band flow and interaction between a standard compressor nut with an imbalance correction region and the ported shroud compressor housing that reduces first order pulsation noise. Still another advantage of the present invention is that the ported shroud compressor housing includes flow diameter transitions at or before a compressor inducer that may cause aero-acoustic noises. A further advantage of the present invention is that the ported shroud compressor housing may have an inlet of diameter less than a diameter of a compressor inducer.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 4 is an enlarged view of yet another embodiment, according to the present invention, of the compressor portion of the turbocharger of FIG. 1.

FIG. 5 is an enlarged view of still another embodiment, according to the present invention, of the compressor portion of the turbocharger of FIG. 1.

FIG. 6 is an enlarged view of a further embodiment, according to the present invention, of the compressor portion of the turbocharger of FIG. 1.

FIG. 7 is a graph of compressor outlet first order pulsation of the compressor portion for the turbocharger of FIG. 2.

DETAILED DESCRIPTION OF THE INVENTION

Figure 1:
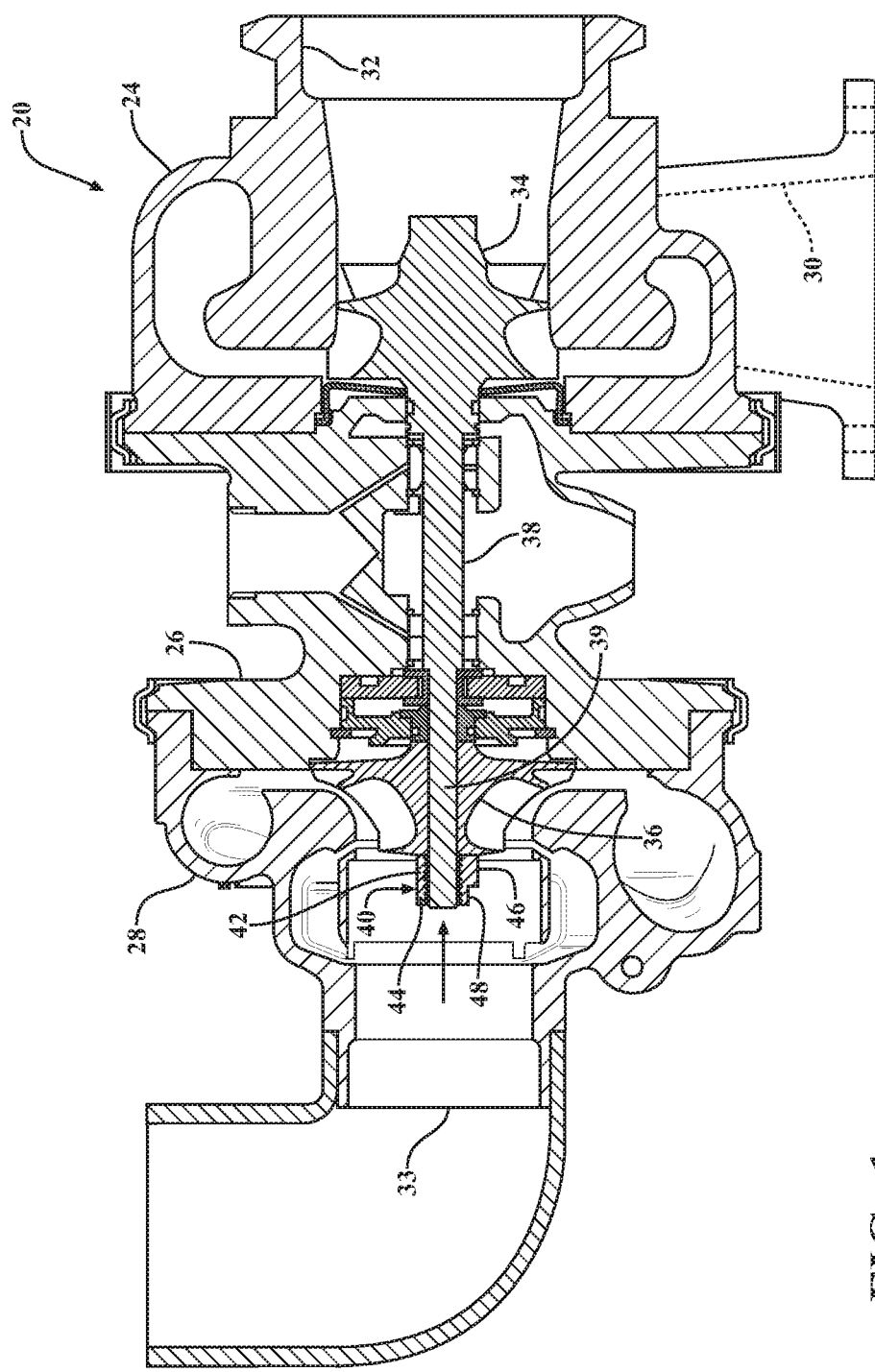
FIG. 1 is a sectional view of a turbocharger, according to one embodiment of the present invention.

Referring now to the figures, where like numerals are used to designate like structure unless otherwise indicated, a turbocharger 20, according to one embodiment of the present invention, is shown in FIG. 1. As illustrated in FIG. 1, the turbocharger 20 includes a housing, generally indicated at 22, having a turbine housing 24, a shaft housing 26, and a compressor housing 28. The turbine housing 26 has a turbine exhaust gas inlet 30 to receive exhaust gas from an internal combustion engine (not shown) and a turbine exhaust gas outlet 32. The compressor housing 28 is of a ported type and will be referred to subsequently as the ported shroud compressor housing 28. The ported shroud compressor housing 28 has a compressor ambient air inlet 33 to receive ambient airflow as indicated by the arrow and a compressor air discharge outlet (not shown) to deliver compressed air to the internal combustion engine. In one embodiment, the turbocharger 20 may include a rotatable turbine wheel, generally indicated at 34, disposed in the turbine housing 26. The turbocharger 20 includes a rotatable compressor impeller or wheel, generally indicated at 36, disposed in the ported shroud compressor housing 28. The turbocharger 20 further includes a rotatable turbocharger shaft 38 coupled to the turbine wheel 34 and the compressor wheel 36 and rotationally supported by bearings in the shaft housing 26. The turbocharger shaft 38 extends along a longitudinal axis A. The turbine wheel 34 is solidly affixed to one end of the turbocharger shaft 38, becoming a shaft and wheel assembly. The compressor wheel 36 is coupled to the other end of the turbocharger shaft 38, referred to as a "stub shaft" 39. It should be appreciated that an example of a turbocharger is disclosed in U.S. Patent Application Publication No. 2015/0219121 to King, the entire disclosure of which is hereby expressly incorporated by reference.

In another embodiment, the turbocharger 20 may include an electric motor (not shown) to electrically power and drive the compressor wheel 36. The electric motor is of a high speed type and may be constructed using magnetically loaded composite (MCL) rotor technology. The electric motor includes a rotor coupled to the turbocharger shaft 38 and a stator connected to a housing. The housing may be connected to the ported shroud compressor housing 28. The compressor wheel 36 is provided on one end of the turbocharger shaft 38. The electric motor may be powered by batteries, a generator, or a fuel cell. It should be appreciated that an example of a turbocharger with an electrically powered compressor is disclosed in International Patent Application Publication No. WO 03/040567 to Pflueger et al., the entire disclosure of which is hereby expressly incorporated by reference.

Figure 2:
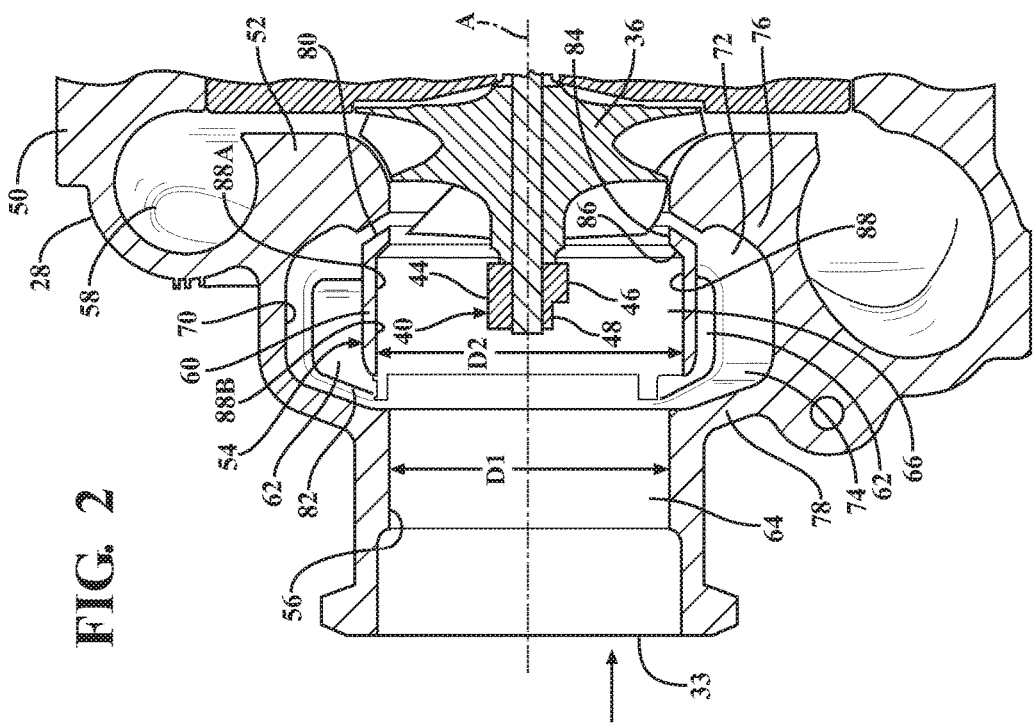
FIG. 2 is an enlarged view of one embodiment of a compressor portion of the turbocharger of FIG. 1.

Referring to FIG. 2, in one embodiment of the turbocharger 20, the compressor wheel 36 is disposed about the stub shaft 39 and a compressor nut, generally indicated at 40, is in threaded engagement with the stub shaft 39 by a plurality of threads 42. The compressor wheel 36 is held in position by a clamp load from the compressor nut 40. In the embodiment illustrated, the compressor nut 40 includes a balance portion 44 disposed about the stub shaft 39 adjacent the outboard end of the compressor wheel 36. The compressor nut 40 also includes a fastener portion 46 disposed about and coupled to the stub shaft 39 by the threads 42 adjacent the balance portion 44. In one embodiment, the fastener portion 46 is hexagonal in shape, but may be any suitable symmetrical shape. The balance portion 44 is generally cylindrical in shape. The compressor nut 40 also includes an imbalance correction region 48 extending radially into the balance portion 44 for correcting an imbalance of the turbocharger shaft 38. The imbalance correction region 48 may be defined as a planar shape or an arcuate shape extending longitudinally and laterally across the balance portion 44. In one embodiment, the imbalance correction region 48 may have a width of 2.0 millimeters and a depth of 1.55 millimeters. The compressor nut 40 is made of a rigid material such as metal. The compressor nut 40 is integral, unitary, and one-piece.

A compressor portion of the turbocharger 20 is meant to broadly mean the ported shroud compressor housing 28 that houses the compressor wheel 36 and may include a compressor cover (not shown). As illustrated in FIG. 2, one embodiment of the ported shroud compressor housing 28, according to the present invention, includes a volute base portion 50, a contour 52, an inducer 54, and an inlet section 56. It should be appreciated that the components can be separately machined or molded parts, which may allow for ease of production, testing, assembly or tailoring parts for specific turbocharger applications. It should also be appreciated that any or all of these parts can be formed as integral or combined components.

The volute base portion 50 includes an air passage 58 that increases as it approaches discharge for more static pressure. The volute base portion 50 may be molded or machined to cooperate with the inducer 54 and the inlet section 56 to form cavities for recirculation of airflow. It should be appreciated that the volute base portion 50 is operably connected and adjacent to the compressor wheel 36 to also provide normal airflow to the engine.

The contour 52 may be cut into the ported shroud compressor housing 28 or be a separate piece fastened to the volute base portion 50 to complementarily match the compressor wheel 36. The contour 52 surrounds and encircles a portion of blades on the compressor wheel 36 in close tolerances to avoid contact with the compressor wheel 36 as the compressor wheel 36 rotates.

The inducer 54 may form a ring 60 around a distal end of the compressor wheel 36, and a plurality of extending members 62 may radially extend from the ring 60. The extending members 62 can be perpendicular to the ring 60 or they may be angled (on either axis) relative to the ring 60 or shaft 39 to direct recirculation airflow into the inlet section 56 with rotation or counter-rotation relative to the movement of the compressor wheel 36.

The inlet section 56 is the outermost portion of the ported shroud compressor housing 28 where the air flows into the air inlet 33. As illustrated in FIG. 2, the inlet section 56 has a straight or linear wall 64. The linear wall 64 of the inlet section 56 may be aligned with an inner surface wall 66 of a wall of the ring 60 of the inducer 54 for smooth air flow. The top of the inner surface wall 66 is preferably arcuate.

The ported shroud compressor housing 28 may include a recirculation cavity 70 formed around and adjacent to the ring 60 of the inducer 54. The recirculation cavity 70 may be formed by hollows 72 and 74 formed by a volute middle wall 76 and an inlet section hollow wall 78. As illustrated in FIG. 2, the extending members 62 of the inducer 54 can extend to engage the inlet section hollow wall 78 of the inlet section 56. It should be appreciated that the extending members 72 may be integrally formed with either or both the volute middle wall 76 and the inlet section hollow wall 78.

The recirculation cavity 70 may include an angled recirculation slot 80 and an inlet re-entry slot 82. The angled recirculation slot 80 surrounds a leading edge of the compressor wheel 36. The angle of the angled recirculation slot 80 may be formed by the bottom of the ring 60 of the inducer 54 and a portion of the contour 52. The inlet re-entry slot 82 is preferably open between the linear wall 64 and the inner wall surface 66 of the ring 60 for airflow to be recirculated. In one embodiment, the inlet re-entry slot 82 extends along the longitudinal axis A between approximately one (1) millimeter and approximately twenty (20) millimeters. In another embodiment, the inlet re-entry slot 82 extends along the longitudinal axis A between approximately one (1) millimeter and approximately twelve (12) millimeters. In yet another embodiment, the inlet re-entry slot 82 extends along the longitudinal axis A between approximately one (1) millimeter and approximately five (5) millimeters. It should be appreciated that the widths of the angled recirculation slot 80 and the inlet re-entry slot 82 can vary to achieve desired airflow.

The angled recirculation slot 80 provides an escape path for air on the slower tip of the compressor wheel 36. The air is recirculated through the recirculation cavity 70 and out the inlet re-entry slot 82 back into the inlet section 56 for surge control. In the process, the surge margin is improved and extended when operating on the left side of the map. On the right side of the map, the operating range can also be extended.

The specific geometry of the recirculation components also adds stability to the airflow. The choppy air noise can be smoothed out and stabilized. The recirculation to the inlet section 56 can stabilize the entire compressor stage of turbocharger 20, particularly when the compressor wheel 36 is operated near its surge point. It should be appreciated that an example of a compressor housing for turbochargers is disclosed in U.S. Patent Application Publication No. 2015/0159664 to Olin et al., the entire disclosure of which is hereby expressly incorporated by reference.

As shown in cross section of the inducer 54 of FIG. 2, the inlet section 56 has a first diameter D1 and the ring 60 has a second diameter D2. The diameter D2 is greater than the diameter D1 to produce an expanding airflow geometry. This difference in diameter prevents a disturbance in the airflow, which may cause aero-acoustic noises such as a first order pulsation noise with the compressor nut 40.

The innermost surface or inner surface wall 66 of the ring 60 defines a first section 84 extending axially along the longitudinal axis A and proximate to the compressor wheel 36, a second section 86 extending from the first section 84 radially away from the longitudinal axis A, and a third section 88 extending from the second section 86 along the longitudinal axis A and distal to the compressor wheel 36. In one embodiment, the second section 86 may extend from approximately 0.1 millimeters to approximately ten (10) millimeters and may be at an angle between approximately zero (0) degrees and approximately ninety (90) degrees to the longitudinal axis A. In another embodiment, the second section 86 may be at an angle between approximately forty-five (45) degrees and approximately ninety (90) degrees to the longitudinal axis A. In one embodiment, the third section 88 may extend radially away from the longitudinal axis A from the second section 86 at an angle between approximately zero (0) degrees and approximately twenty (20) degrees. In another embodiment, the third section 88 may extend radially away from the longitudinal axis A at an angle spaced from the second section 86 between approximately zero (0) degrees and approximately forty-five (45) degrees. In yet another embodiment, the third section 88 may have more than one angle or taper relative 88A and 88B to the longitudinal axis A. In this embodiment, the first angle 88A may range from approximately zero (0) degrees to approximately twenty (20) degrees and the second angle 88B may range from approximately zero (0) degrees to approximately forty-five (45) degrees. The first angle 88A or second angle 88B may extend radially away from the longitudinal axis A between approximately one (1) millimeter to approximately ten (10) millimeters from the proximal end to the distal end and/or approximately one (1) percent to approximately twenty-five (25) percent of the diameter of the inducer 54. It should be appreciated that the third section 88 may include either the first angle 88A, the second angle 88B, or both.

Figure 3:
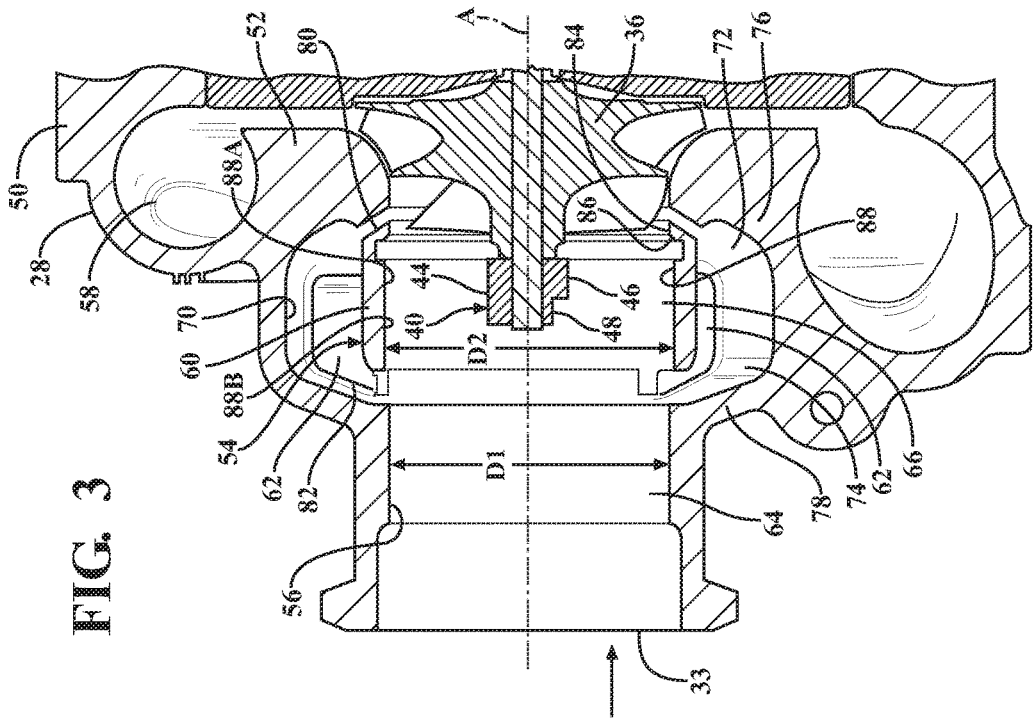
FIG. 3 is an enlarged view of another embodiment, according to the present invention, of the compressor portion of the turbocharger of FIG. 1.

In the embodiment illustrated in FIG. 2, the second section 86 of the ring 60 extends radially away from the longitudinal axis A at an angle of approximately forty-five degrees and for approximately one (1) millimeter and the third section 88 of the ring 60 is tapered radially away from the longitudinal axis A from the proximal end to the distal end. In another embodiment for the ring 60 of FIG. 2, the third section 88 of the ring 60 is linear or straight with parallel sides to the longitudinal axis A. In the embodiment illustrated in FIG. 3, the second section 86 of the ring 60 is angled at ninety (90) degrees and is formed as a rectangular groove and the third section 88 of the ring 60 may be linear or tapered radially away from the longitudinal axis A from the proximal end to the distal end. In the embodiment illustrated in FIG. 4, the second section 86 of the ring 60 extends radially away from the longitudinal axis A at an angle of approximately ninety (90) degrees and for approximately one (1) millimeter and the third section 88 of the ring 60 is tapered radially away from the longitudinal axis A from the proximal end to the distal end. In another embodiment of the ring 60 of FIG. 4, the third section 88 of the ring 60 is linear or straight with parallel sides to the longitudinal axis A. In the embodiment illustrated in FIG. 5, the second section 86 of the ring 60 extends radially away from the longitudinal axis A by at least two angles, such as a first surface 86A oriented at a first angle relative to the first section 84 and a second surface 86B oriented at a second angle relative to the first surface 86A, and the third section 88 of the ring 60 may be linear or tapered radially away from the longitudinal axis A from the proximal end to the distal end. In the embodiment illustrated in FIG. 6, the second section 86 of the ring 60 is either arcuate, parabolic, or elliptical in shape and the third section 88 of the ring 60 may be linear or tapered radially away from the longitudinal axis A from the proximal end to the distal end. It should be appreciated that, in the embodiments of FIGS. 2-6, the diameter D2 is greater than the diameter D1 to produce an expanding airflow geometry.

Referring to FIG. 7, a graph 100 of compressor outlet first order pulsation is shown for a radial depth imbalance correction of one (1) millimeter for the compressor nut 40 of turbocharger 20 is shown. The graph 100 has a vertical axis 102 of scaled sound level in decibels (db) (pulsation) and a horizontal axis 104 of air mass flow in kilograms per second (kg/s). The graph 100 also includes plots 106, 108, and 110 corresponding to the specific geometry of the ring 60. The plot 106 is a baseline where the first section 84, second section 86, and third section 88 are linear or straight and D1 equals D2. The plot 108 is where the second section 86 extends radially away from the longitudinal axis A at an angle of approximately forty-five (45) degrees for approximately one (1) millimeter and the third section 88A extends linearly or straight parallel to the longitudinal axis A from the proximal end to the distal end and D2 is greater than D1. The plot 110 is where the second section 86 extends radially away from the longitudinal axis A at an angle of approximately forty-five (45) degrees for approximately (1) millimeter and the third section 88A is a tapered wall extending radially away from the longitudinal axis A from the proximal end to the distal end and D2 is greater than D1. It should be appreciated that plots 108 and 110 show a five (5) to six (6) db reduction in aero-acoustic noise such as pulsation noise below the baseline level of plot 106.

Accordingly, the turbocharger 20 of the present invention provides a ported shroud compressor housing 28 and a compressor nut 40 having an imbalance correction region 48 to improve NVH and rotor stability performance. The turbocharger 20 of the present invention has the ported shroud compressor housing 28 with an inlet geometry to reduce the sensitivity of first order pulsation noise and blade pass (BPF) error states that generate a pulsation noise or other aero-acoustic issues. The turbocharger 20 of the present invention improves broad band flow and interaction between a standard compressor nut 40 with an imbalance correction region 48 and the ported shroud compressor housing 28 that reduces first order pulsation noise. The turbocharger 20 of the present invention has the ported shroud compressor housing 28 producing an expanding airflow geometry to reduce aero-acoustic noises.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the invention may be practiced other than as specifically described.

What is claimed is:

1. A turbocharger comprising:
a rotatable turbocharger shaft extending along a longitudinal axis;
a compressor wheel coupled to and rotatable by said turbocharger shaft for compressing air to be delivered to an internal combustion engine;
a ported shroud compressor housing disposed about said compressor wheel, said ported shroud compressor housing including an air inlet passage extending axially along and circumferentially about said longitudinal axis, a volute base portion operably adjacent to said compressor wheel, a contour that encircles and complementarily matches said compressor wheel, an inducer including a ring disposed about said longitudinal axis, an inlet section extending from said volute base portion, and a recirculation cavity formed in said volute base portion and said inlet section with a recirculation slot and an inlet slot for reentry of airflow into said inlet section;
said ring including an inner wall surface defining a first section extending axially along said longitudinal axis and proximate to said compressor wheel, a second section extending from said first section radially away from said longitudinal axis, and a third section extending from said second section along said longitudinal axis and distal to said compressor wheel, wherein a portion of said third section is tapered radially away from said longitudinal axis from an end proximal to said compressor wheel to an end distal to said compressor wheel; and
said inlet section having a first diameter and said third section having a second diameter greater than said first diameter.

2. A turbocharger as set forth in claim 1 wherein said second section extends radially away from said longitudinal axis a distance between 0.1 millimeters and 10 millimeters.

3. A turbocharger as set forth in claim 1 wherein said second section extends radially away from said longitudinal axis at an angle between zero degrees and ninety degrees.

4. A turbocharger as set forth in claim 1 wherein said second section extends radially away from said longitudinal axis at an angle of forty-five degrees.

5. A turbocharger as set forth in claim 1 wherein said second section extends radially away from said longitudinal axis at an angle of ninety degrees.

6. A turbocharger as set forth in claim 1 wherein said third section extends radially away from said longitudinal axis from a proximal end to a distal end between one millimeter and ten millimeters.

7. A turbocharger as set forth in claim 1 wherein said third section extends radially away from said longitudinal axis from said second section at an angle between zero degrees and twenty degrees.

8. A turbocharger as set forth in claim 1 wherein said third section extends radially away from said longitudinal axis at an angle spaced distally from said second section at an angle of between zero degrees and forty-five degrees.

9. A turbocharger as set forth in claim 1 wherein said second section is one of arcuate, parabolic, and elliptical shape.

10. A turbocharger as set forth in claim 1 wherein said second section extends radially away from said first section by at least a first surface oriented at a first angle relative to said first section and a second surface oriented at a second angle relative to said first surface to said third section.

11. A turbocharger as set forth in claim 1 wherein said second section is a groove extending radially away from said longitudinal axis.

12. A turbocharger as set forth in claim 1 wherein said inlet re-entry slot extends along said longitudinal axis between one millimeter and twenty millimeters.

13. A turbocharger as set forth in claim 1 wherein said inlet re-entry slot extends along said longitudinal axis between one millimeter and twelve millimeters.

14. A turbocharger as set forth in claim 1 wherein said inlet re-entry slot extends along said longitudinal axis between one millimeter and five millimeters.

15. A turbocharger as set forth in claim 1 including a compressor nut coupled to said turbocharger shaft adjacent said compressor wheel.

16. A turbocharger as set forth in claim 15 wherein said compressor nut includes a balance portion disposed about said turbocharger shaft and having a fastener portion disposed about and coupled to said turbocharger shaft adjacent said compressor wheel to fasten said compressor wheel to said turbocharger shaft.

17. A turbocharger as set forth in claim 16 wherein said balance portion includes an imbalance correction region at an outboard end thereof.

18. A turbocharger as set forth in claim 17 wherein said imbalance correction region extends radially into said balance portion.

19. A turbocharger comprising:
a rotatable turbocharger shaft extending along a longitudinal axis;
a compressor wheel coupled to and rotatable by said turbocharger shaft for compressing air to be delivered to an internal combustion engine;
a compressor nut comprising a balance portion disposed about said turbocharger shaft and a fastener portion disposed about and coupled to said turbocharger shaft adjacent said compressor wheel to fasten said compressor wheel to said turbocharger shaft, said balance portion including an imbalance correction region at an outboard end thereof;
a ported shroud compressor housing disposed about said compressor wheel, said ported shroud compressor housing including an air inlet passage extending axially along and circumferentially about said longitudinal axis, a volute base portion operably adjacent to said compressor wheel, a contour that encircles and complementarily matches said compressor wheel, an inducer including a ring disposed about said longitudinal axis, an inlet section extending from said volute base portion, and a recirculation cavity formed in said volute base portion and said inlet section with a recirculation slot and an inlet slot for reentry of airflow into said inlet section;

said ring including an inner wall surface defining a first section extending axially along said longitudinal axis and proximate to said compressor wheel, a second section extending from said first section radially away from said longitudinal axis, and a third section extending from said second section along said longitudinal axis and distal to said compressor wheel, wherein a portion of said third section is tapered radially away from said longitudinal axis from an end proximal to said compressor wheel to an end distal to said compressor wheel; and said inlet section having a first diameter and said third section having a second diameter greater than said first diameter.

20. A turbocharger as set forth in claim 19 wherein said second section extends radially away from said longitudinal axis a distance between 0.1 millimeters and 10 millimeters.

21. A turbocharger as set forth in claim 19 wherein said second section extends radially away from said longitudinal axis at an angle between zero degrees and ninety degrees.

22. A turbocharger as set forth in claim 19 wherein said second section extends radially away from said longitudinal axis at an angle of forty-five degrees.

23. A turbocharger as set forth in claim 19 wherein said second section extends radially away from said longitudinal axis at an angle of ninety degrees.

24. A turbocharger as set forth in claim 19 wherein said third section extends radially away from said longitudinal axis from a proximal end to a distal end between one millimeter and ten millimeters.

25. A turbocharger as set forth in claim 19 wherein said third section extends radially away from said longitudinal axis from said second section at an angle between zero degrees and twenty degrees.

26. A turbocharger as set forth in claim 19 wherein said third section extends radially away from said longitudinal axis at an angle spaced distally from said second section at an angle of between zero degrees and forty-five degrees.

27. A turbocharger as set forth in claim 19 wherein second section is one of arcuate, parabolic, and elliptical shape.

28. A turbocharger as set forth in claim 19 wherein said second section extends radially away from first section by at least a first surface oriented at a first angle relative to said first section and a second surface oriented at a second angle relative to said first surface to said third section.

29. A turbocharger as set forth in claim 19 including a turbine wheel coupled to said turbocharger shaft.

30. A turbocharger comprising:
a rotatable turbocharger shaft extending along a longitudinal axis;
a compressor wheel coupled to and rotatable by said turbocharger shaft for compressing air to be delivered to an internal combustion engine;
a compressor nut comprising a balance portion disposed about said turbocharger shaft and a fastener portion disposed about and coupled to said turbocharger shaft adjacent said compressor wheel to fasten said compressor wheel to said turbocharger shaft, said balance portion including an imbalance correction region at an outboard end thereof;
a ported shroud compressor housing disposed about said compressor wheel, said ported shroud compressor housing including an air inlet passage extending axially along and circumferentially about said longitudinal axis, a volute base portion operably adjacent to said compressor wheel, a contour that encircles and complementarily matches said compressor wheel, an inducer including a ring disposed about said longitudinal axis, an inlet section extending from said volute base portion, and a recirculation cavity formed in said volute base portion and said inlet section with a recirculation slot and an inlet slot for reentry of airflow into said inlet section;
said ring including an inner wall surface defining a first section extending axially along said longitudinal axis and proximate to said compressor wheel, a second section extending from said first section radially away from said longitudinal axis at an angle of approximately forty-five degrees and radially away from said longitudinal axis approximately one millimeter, and a third section extending from said second section along said longitudinal axis and distal to said compressor wheel, wherein a portion of said third section is tapered radially away from said longitudinal axis from an end proximal to said compressor wheel to an end distal to said compressor wheel; and
said inlet section having a first diameter and said third section having a second diameter greater than said first diameter.

* * * * *